United States Patent [19]

Wiener

[11] 3,915,037
[45] Oct. 28, 1975

[54] TOOL FOR STRIPPING THE SHEATHING FROM SHEATHED CABLES AND THE LIKE

[75] Inventor: Hans Wiener, Stockholm, Sweden

[73] Assignee: Holdema, Ltd., Stockholm, Sweden

[22] Filed: Dec. 27, 1974

[21] Appl. No.: 536,808

[30] Foreign Application Priority Data
Jan. 17, 1974 Germany............................ 2402187

[52] U.S. Cl............................................. 81/9.5 A
[51] Int. Cl.² ........................................ H02G 1/12
[58] Field of Search ......... 30/90.1, 90.4, 90.6, 90.8, 30/91.1, 91.2; 81/9.5 R, 9.5 A

[56] References Cited
UNITED STATES PATENTS
| 1,151,319 | 8/1915 | Wood ................................ 81/9.5 A |
| 3,146,645 | 9/1964 | Hindenburg et al. .............. 81/9.5 A |
| 3,422,708 | 1/1969 | Bieganski........................... 81/9.5 A |
| 3,596,541 | 8/1971 | Bieganski........................... 81/9.5 A |

Primary Examiner—Al Lawrence Smith
Assistant Examiner—J. T. Zatarga
Attorney, Agent, or Firm—Burns, Doane, Swecker & Mathis

[57] ABSTRACT

A plier-like tool for stripping sheathing or insulation from cables and the like has a pair of outer gripping jaws and a pair of stripping jaws longitudinally movable on the inside of the gripping jaws. Compression of handle-like portions of the tool first causes the outer gripping jaws to hold the end of a cable inserted longitudinally into the bite of the gripping jaws, and further compression activates the stripping jaws to cut through the sheathing and then move rearwardly to strip the sheathing from the inserted end of the cable. Cable cutting means can be included in the tool.

20 Claims, 5 Drawing Figures

TOOL FOR STRIPPING THE SHEATHING FROM SHEATHED CABLES AND THE LIKE

BACKGROUND OF THE INVENTION

This invention relates to a tool for stripping the sheathing from sheathed cables and the like, for example the insulating covering from insulated electrical cables and wires of different types, and especially to a pair of stripping pliers for stripping the insulation from the ends of insulated electrical cables or wires.

A prior proposed stripping tool comprises two clamping jaws adapted to hold a sheathed cable during a stripping operation and, adjacent to the inner side of the clamping jaws, two longitudinally movable stripping jaws adapted to cut into the sheathing and to strip this from the cable. Pulling means are provided for moving the stripping jaws in the longitudinal direction of the cable, when the cable is held by the clamping jaws. The tool has a main body to which one of the clamping jaws is pivotally connected and operational means are provided for operating the tool. In the case of a stripping tool in the form of a pair of pliers the operational means are constituted by a handle.

Such prior proposed stripping tools may suffer from several disadvantages, such as, for example, a rather complicated lever system for transmitting movement from the operational means to the pulling means. In one particular prior proposed stripping tool the lever system comprises three different links with four pivot points between them and the other parts of the tool.

It is an object of the present invention to provide a stripping tool in which the disadvantages of the prior proposed stripping tools as above described are reduced or obviated.

SUMMARY OF THE INVENTION

According to this invention there is provided a plier-like tool for stripping the sheathing from sheathed cables and the like, comprising two clamping jaws adapted to hold an end of a cable inserted longitudinally toward the throat of the plier-like tool during the stripping operation and, adjacent to the inner side of the clamping jaws, two longitudinally movable stripping jaws adapted to cut into the sheathing and to strip this from the cable, pulling means for moving the stripping jaws in the longitudinal direction of the cable held by the clamping jaws, a main body to which one of the clamping jaws is pivotally connected, thereby forming a pair of articulated clamping jaws, and means for operating the tool, wherein an extending operating portion of the pivotally connected clamping jaw extends beyond its pivot point, the extending portion being provided with a cam surface which engages the free end of a biased driving arm which at its other end is pivotally connected to the means for operating the tool, the pulling means being provided with a protruding arm located adjacent said cam, the arrangement being such that when the tool is operated, the driving arm first moves along the cam surface thus moving the pivoted clamping jaw towards the other clamping jaw and then engages with the protruding arm, thus moving the pulling means and also the cutting jaws.

Conveniently the tool may be in the form of a pair of stripping pliers for stripping insulation from the ends of cables or wires in which, upon compression of the handle portions, a pair of articulated outer jaws grip a longitudinally inserted wire or cable and, on further compression of the handles a pair of articulated inner jaws first cut through the sheathing and then move longitudinally rearward to strip the sheathing from the end of the cable.

Expediently, in the initial or unoperated position of the tool the angle between the axis of the driving arm and at least a part of the cam surface is either less than 90° or greater than 90° and the pivotal clamping jaw is angled or bent substantially at the pivot point the portion of the clamping jaw on one side of the pivot point extending towards the means for operating the tool, the portions of the clamping jaw on either side of the pivot point subtending an angle of substantially 150°.

Conveniently, the driving arm and/or the protruding arm are provided with rollers for smoother engagement with the cam surface. The arrangement may be such that two identical rollers are disposed one on either side of the protruding arm and/or the driving arm may be in the form of two parallel arms having the roller disposed therebetween. Conveniently the total thickness of the protruding arm with the two rollers substantially corresponds to the thickness of the roller between the parallel arms.

One stripping jaw may be rigidly connected with the pulling means and/or one clamping jaw and a handle constituting part of the operating means are expediently rigidly connected to or integrally formed with the main body of the tool.

A tool in accordance with the invention may conveniently be provided with means for cutting the cable which preferably comprises a protrusion on the pulling means adapted to co-operate with a counter-element rigidly connected to the main body or forming a part of it. The protrusion or the counter-element or both are advantageously provided with a cutting blade. The cutting means may be expediently disposed in an opening in the main body which opening may advantageously be associated with a channel extending to the edge of the main body of the tool, or the cutting means may be disposed in a recess in the side of the main body of the tool and a removable cover or a guard member for the cutting means may be provided.

Advantageously the clamping jaws may be provided with means for retaining the cutting jaws in a substantially constant relative position during longitudinal movement of the cutting jaws, such retaining means preferably consisting of the adjustable, pivotally disposed bridge in at least one of the clamping jaws and of adjusting means acting against an inclined surface on one side of the bridge. Conveniently means may be provided for adjusting the positioning of said pivotal member to enable the tool to strip conductors of varying dimensions.

Expediently biasing means may be provided to return the tool to an initial position after operation thereof and for keeping the whole tool in an initial position ready to receive a cable, preferably including a spring means biasing the stripping jaws away from each other.

The pulling means preferably comprises a member which is at least partially of non-circular cross-section and which is guided in an opening having a cross section corresponding to the portion of the pulling member located in said opening. The main body, expediently may be a hollow double-walled body at least partially housing the pulling means and co-operating elements, particularly in embodiments of the tool in the form of a pair of stripping pliers.

Advantageously the main body may comprise one of said clamping jaws and a further member pivotally secured thereto may constitute the other of said clamping jaws, means being provided for moving said pivotally mounted clamping jaw into engagement with a cable placed between said clamping jaws and for subsequently moving the stripping jaws.

The stripping tool may be provided with two pivotally movable handles adapted to actuate the tool.

Conveniently a portion of the body may constitute one handle.

In other embodiments of the invention the tool may be adapted to be driven pneumatically or hydraulically, and in further embodiments of the tool means may be provided for locating the conductor to be stripped in such a way that the tool will strip predetermined lengths of a conductor.

BRIEF DESCRIPTION OF THE DRAWINGS

In order that the invention may be more readily understood, and so that further features thereof may be appreciated, particular embodiments of a tool in accordance with the invention will now be described by way of example and with reference to the accompanying drawings in which.

DESCRIPTION OF PREFERRED EMBODIMENT

Figure 1:
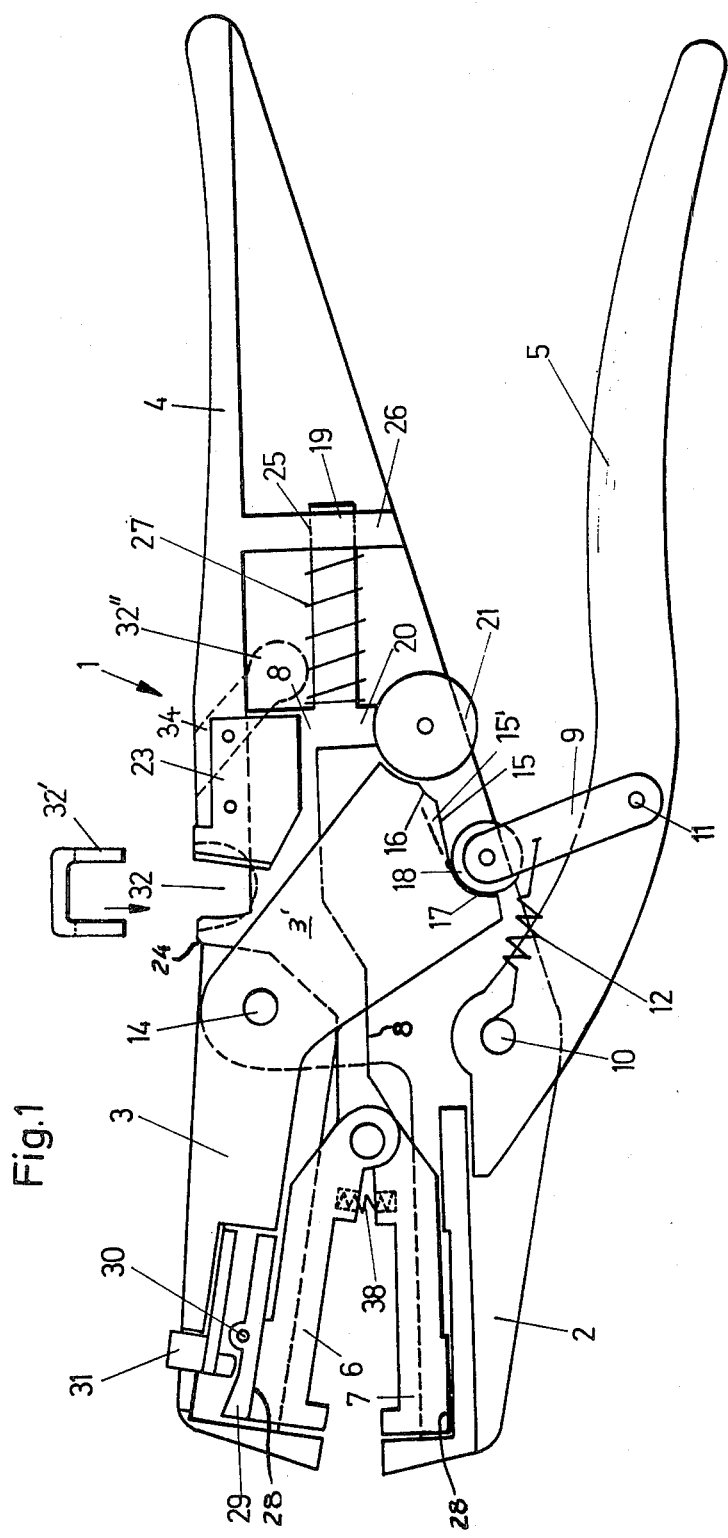
FIG. 1 is a schematic longitudinal section through a stripping tool in the form of a pair of stripping pliers in accordance with the invention, parts thereof being shown in phantom.

Referring to the drawings, a stripping tool in accordance with the invention is in the form of a hand operated pair of stripping pliers, having two legs or handles 4, 5, two outer clamping jaws 2, 3 and two inner stripping jaws 6, 7.

The upper handle 4 and the opposite lower clamping jaw 2 are made integrally with the main body 1 of the pair of pliers.

The main body 1 movably supports the movable elements of the pair of stripping pliers, i.e. the stripping jaws 6, 7, a pulling means 8 adapted to pull the stripping jaws 6, 7, the upper clamping jaw 3, the lower handle 5, and the driving arm 9.

In operation of the tool the handle 4 constituting a portion of the stationary part of the pair of pliers will rest against the flat of the hand of a user thus enabling the tool to be firmly grasped. The lower clamping jaw 2, which is integrally formed with main body 1 of the tool, will constitute a stable support against which the cable or wire to be stripped can be located easily, the clamping jaw 2 not being moved relative to the main body 1 of the tool on operation of the handles 4, 5.

The lower handle 5 is pivotably attached to the main body 1 by means of a pivot pin 10 located adjacent the inner end of the lower clamping jaw 2. Thus, the handle 5 can be pivoted towards any away from the handle 4. A driving arm 9 extends from the lower handle 5 towards the opposite handle 4. The driving arm 9 has one end pivotably attached to the handle 5 by means of a pin 11 placed a short distance outwardly of the pivot pin 10.

The outer clamping jaw 3 is pivotably attached to the upper part of the main body 1 substantially opposite the pin 10 for the pivoting of the handle 5 in such a way that the outer free end of the clamping jaw 3 can be pivoted against the outer free end of the lower clamping jaw 2.

The movable or upper clamping jaw 3 is pivotable about a pin 14 attached to the main body 1 substantially opposite the pin 10 for the pivotable handle 5. The movable clamping jaw 3 is bent or angled through about 150° substantially at the pin 14 and hence comprises a working portion and an extending, operating portion 3' (FIG. 2) which is inclined downwardly towards the pivotable handle 5 and which terminates with a cam surface 15. At one end the cam surface is provided with an end stop or protrusion 17 and at the other end with a bevel cutting or recess 16, the cam having a linear portion intermediate the step 17 and the recess 16.

The driving arm 9 pivotably attached to the pivotable handle 5 is provided at its free end with a bearing or a roller 18 which is adapted to be engaged with the cam surface 15 and which by the aid of a spring 12 is urged into engagement with the end stop 17 when the handle 5 is not operated. The spring 12 has one end attached to the pin 10 and the other end attached to the driving arm 9. The angle between the driving arm 9 and the linear portion of the cam surface 15 is preferably less than 90° in the initial or unoperated position of the tool.

Figure 3:
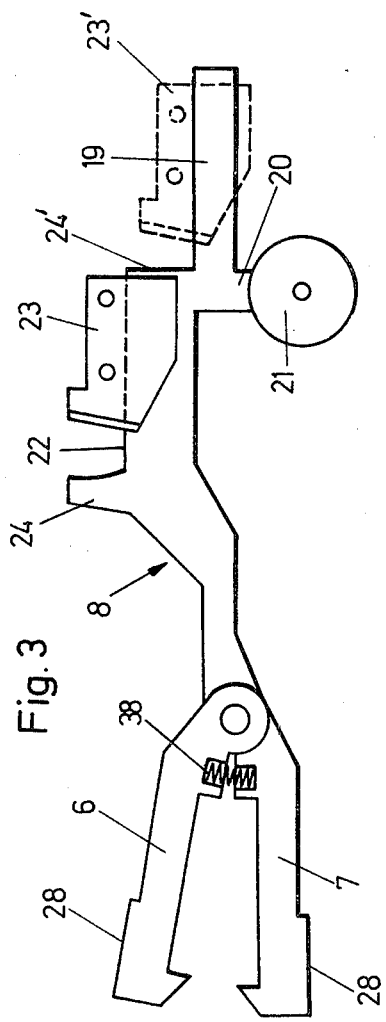
FIG. 3 is a schematic side view of the stripping jaws and the pulling member, as well as of the cutting mechanism of the tool illustrated in FIG. 1, showing slight modifications.

A pulling member 8 is provided to pull the stripping jaws 6 and 7. The pulling member 8 supports the stripping jaws 6, 7, at least one of them pivotably, at one end and is at the other end shaped as a rod 19 which preferably has a non-circular, e.g. rectangular cross section. One of the stripping jaws, jaw 7 in the embodiment shown, is rigidly connected to the pulling member 8, as shown in detail in FIG. 3.

At one end of the rod 19 a protruding arm 20 extends downwardly towards the movable handle 5 and supports at its free end a roller 21 which in the initial position of the tool is situated adjacent the recess 16 in the cam surface 15.

The side of the pulling member 8 which is oposite the protruding are 20 is shaped as a planar sliding surface 22 which ends with a protrusion 24. The protrusion 24 is located adjacent a recess 32 (FIG. 1) in the upper edge of the main body 1 of the tool. The edge of this recess which is opposite to the protrusion 24 when the tool is in an initial unoperated position, is provided with a cutting blade 23 for cutting cable or wire introduced into the recess. However, it is to be understood that instead of the recess 32 being provided with a cutting blade the protrusion 24 could be provided with a cutting blade. Alternatively both the recess 32 and the protrusion 24 may be provided with co-operating cutting blades. A removable cover 32', preferably of transparent material, may be provided for this cutting device constituted by the protrusion 24 and the blade 23. The cover may be fixed in position by a snap action may be formed with two legs having slots therein through which the protrusion 24 and the cutting edge 23 may pass. By removing the cover a cable can be cut at any desired location merely by inserting the cable in the recess and operating the handles of the tool. In cutting a length of cable there is no need to feed the cable through an aperture.

Figure 5:
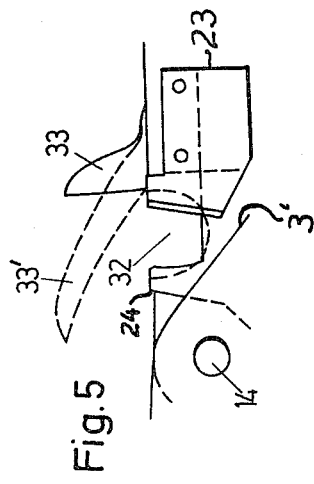
FIG. 5 is a schematic side view of a safety arrangement on the tool illustrated in FIG. 1, again showing slight modifications.

Instead of removable cover 32' protection may be provided at the rearward edge of recess 32 in form of the upright finger 33 as shown in solid line in FIG. 5 or, preferably, a slanting finger 33' as shown in phantom in FIG. 5. Alternatively, the cutting edge may be located at the position 23' shown in phantom in FIG. 3, the edge 24' taking over the role of the protrusion 24. Recess 32 is then replaced by an aperture 32" shown in phantom in FIG. 1. The aperture 32" may be an aperture that is closed on all sides so that a cable to be cut must be passed through the aperture until the portion of the cable which is to be cut is adjacent the cutting edge 23' although preferably the opening 32" may be provided with a channel 34 as shown in phantom in FIG. 1 to enable the cable to be introduced into the cutting means right at the spot where it is to be cut off. It is evident that even in this case the hand of the user is prevented from accidentally engaging the cutting blade or blades which operates at the bottom of channel 34, although in the interest of improved safety it is preferred that the blade or blades slant relative the edge of the handle 4.

The protrusion 24 or 24' is, in the initial position of the tool, sufficiently remote from the opposite side of the recess 32 or opening 32" to form a passage for receiving a cable to be cut.

A cable to be cut may thus be placed between the stationary portion with its cutting edge 23 and the protrusion 24. When the handles of the pair of pliers are urged together, the protrusion 24 will force the cable against the cutting edge 23 thus cutting the cable.

The portion of the pulling member 8 shaped as a rod 19 is slidably extended through an opening 25 in a wall 26 extending inwardly from the handle 4, the opening 25 having a shape corresponding to the cross-section of the rod 19. A spring 27 is located around the rod 19 and is engaged with the wall 26 and the protruding arm 20 to bias the pulling member 8 to the initial position in which the jaws 2, 3 and 6, 7 are open for receipt of a cable to be stripped. By giving the rod 19 rectangular cross section, the pulling member 8 may be accurately guided, which ensures a correct operation when cutting cables, since a twisting force may sometimes be exerted on the pulling rod 19.

The surfaces of the stripping jaws 6, 7 adjacent the clamping jaws 2, are provided with sliding surfaces 28 adjacent the leading edges thereof. In the illustrated embodiment one of the clamping jaws, the movable clamping jaw 3, is provided with an adjustable bridge 29 (FIG. 1) which is pivotable about a pin 30 placed substantially in the middle of said bridge. By moving an adjusting knob 31 acting aginst inclined planar member located on the back side of bridge 29 on one side of the pin 30, the inclination of the bridge 29 can be adjusted. The adjusting knob 31 projects from the outside of the clamping jaw through a longitudinal slit therein. Both clamping jaws can also be provided with a device that reduces the friction between the stripping jaws. As a result of the provision of bridge 29 the stripping jaws during the stripping operation can slip against substantially parallel surfaces approaching one another.

The operation of the pair of stripping pliers in accordance with the invention will now be described.

Figure 2:
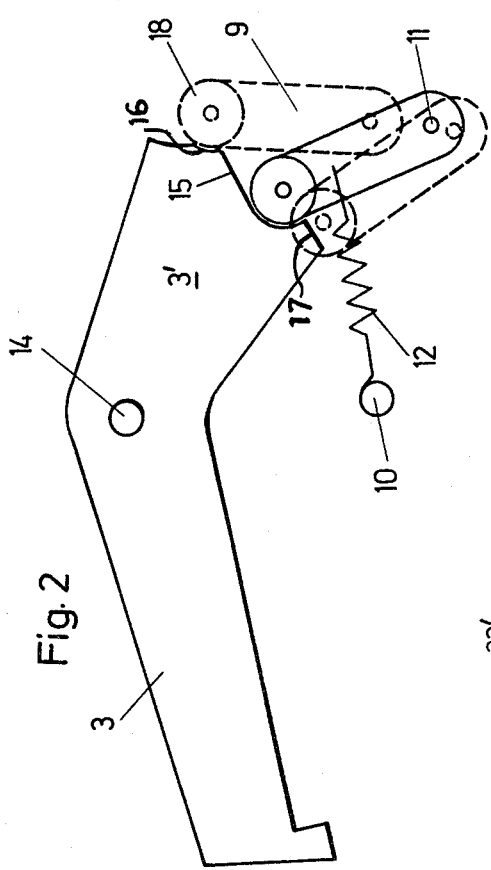
FIG. 2 is a view of part of the clamping jaw and driving arm of the tool illustrated in FIG. 1, the driving arm being shown in three different positions.

A cable to be stripped is located between the clamping jaws 2 and 3 and the handles 4 and 5 are urged together until the cable is firmly grasped by the clamping jaws. When the movable handle 5 is pivoted or forced towards the stationary handle 4, the roller 18 of the driving arm 9 will be forced against the cam surface 15 and the movable clamping jaw 3 will start to pivot towards the stationary clamping jaw 2. Due to the fact that the clamping jaws are forced against each other, the stripping jaws 6, 7 will also be forced against each other. In FIG. 2 the different positions of the driving arm 9 are shown during the movement, while the movable jaw 3 is shown in clamping position.

The angle between the cam surface 15 and the driving arm 9 is in one embodiment less than 90° in the initial position, but will during the clamping movement exceed 90°. The result of this is, that when a cable is placed between the jaws for stripping the insulation from the conductor, the clamping jaws will be forced against the conductor and a reaction will arise. Due to the fact that the angle has been altered, the force of the spring 12 has to be overcome, i.e. the force of said spring will to some extent determine the force with which the clamping jaws will clamp the cable. When the clamping force exceeds the force of the spring and the force necessary to move the roller 18 along the cam surface 15, the roller 18 will start to move from the end stop 17 towards the recess 16 and the roller 21 on the pulling member 8. In another embodiment, the angle between the cam surface and the driving arm 9 is more than 90° in the initial position, as shown at 15', thus preventing jamming of the tool in the initial position.

Further forcing of the handles against each other will move the roller 18 into contact with the roller 21 on protruding arm 20 of the pulling member 8 and will start to push the pulling member 8 backwardly and together therewith also the stripping jaws 6, 7.

The stripping jaws 6, 7 may in per se known manner be formed with a plurality of parallel blades which either are of a resilient type or which are resiliently mounted on a rubber or plastics member. The blades, not shown, are provided with cutting edges at the outer ends which cut into the insulation on the cable when pressed thereagainst. As the position of the cutting edges is determined by the distance between the clamping jaws and the core of the cable, said cutting edges connot penetrate into the core and damage the core. The present invention is not however limited to the use of blade jaws, and in FIG. 3 unsubdivided stripping jaws are shown.

When the stripping jaws 6, 7 have been moved a longitudinal distance, predetermined by the construction of the tool, e.g. 10 millimetres, the roller 18 will move into the recess 16 made in the cam surface 15. The result thereof is that the clamping jaws are opened and the stripped conductor can be removed before the stripping jaws are returned to the initial position, which return takes place when the force on the handle 5 is released. Then the spring 27 returns the pulling member 8 to the initial position and a spring 38 opens the stripping jaws. Spring 12 returns the driving arm 9 to the initial position in which the roller 18 is in engagement with the end stop 17 and the tool is ready for the next stripping operation. The inclination of the bridge 29 is adjusted into correspondence with the diameter of the conductor to be stripped before the stripping operation.

Each time the pulling member 8 is pressed backwardly for stripping, the protrusion 24 will pass the recess 32. A cable placed in this recess 32 will then be pressed or forced against the stationary cutting edge 23 which will cut the cable.

Figure 4:
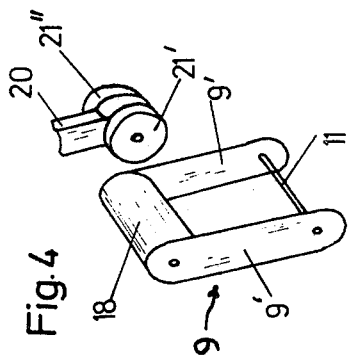
FIG. 4 is a view of the driving arm and the protruding arm of the tool illustrated in FIG. 1 showing slight modifications.

As shown in FIG. 4 the driving arm may be shaped as a double arm 9' with roller 18 between the two parts of the double arm. The protruding arm 20 may be provided with rollers 21' and 21'' on each side, the arrangement being such that the total thickness of protruding arm 20 and both rollers 21' and 21'' substantially coresponds to the thickness of roller 18. However, it must be understood that neither driving arm 9 nor protruding arm 20 needs any roller at all.

It is to be understood that while the invention has been described by way of example, the tool described above can be modified and automated in several respects. Hence, it can lack the cutting device as well as the adjustable bridge or at least one of these, but in a suitable universal embodiment which is particularly suitable as a portable tool for, e.g. electricians, it should preferably comprise all the details included in the above embodiment. The main body 1 of the tool may be hollow and may substantially house the pulling member and associated elements.

However, a tool in accordance with this invention can be shaped as a gun and it can be driven pneumatically or hydraulically. It can also be provided with adjusting means locating the cable to be stripped in such a way that the bare portions of the cable will be of substantially the same length in every stripping operation.

The present invention may be embodied in other specific forms without departing from the spirit or essential characteristics thereof. The present disclosed embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A tool for stripping the sheathing from sheathed cables comprising:
   a. a pair of articulated clamping jaws for holding an end of a sheathed cable during stripping operations, a first of said clamping jaws forming one end of an elongated main body to which the second of said clamping jaws is pivotably connected, said pivotable clamping jaw having a portion extending backwardly from the pivot point and provided at its rear extremity with a cam surface;
   b. a pair of longitudinally movable, articulated stripping jaws adjacent the inner sides of the clamping jaws, said stripping jaws having cutting edges for cutting into the sheathing and for stripping said sheathing from the cable;
   c. pulling means on said elongated main body connected to the stripping jaws for pulling said stripping jaws in a direction longitudinal to a cable held in the clamping jaws; and
   d. means for operating said clamping jaws and stripping jaws comprising:
      i. an elongated member pivotably connected by one end thereof to the elongated main body and extending longitudinally backward away from the clamping jaws;
      ii. a biased driving arm pivoted at one end thereof to said elongated member, the free end of said driving arm engaging the cam surface on said pivotable clamping jaw; and
      iii. a projecting member on said pulling means adjacent the cam so located that when the elongated main body and pivoted elongated member are urged together, the free end of said driving arm first moves along the cam surface to simultaneously close the articulated clamping jaws and the stripping jaws and then engages the projecting member on said pulling means to pull said cutting jaws in a longitudinal direction to strip the sheathing from the end of a cable held by the clamping jaws.

2. A tool as claimed in claim 1 wherein the tool is in the form of a pair of stripping pliers for stripping insulation from the ends of cables or wires.

3. A tool as claimed in claim 1 wherein the free end of the driving arm is provided with roller means.

4. A tool as claimed in claim 1 wherein the projecting member is provided with roller means.

5. A tool as claimed in claim 1 in which the cam surface has at one end thereof an end stop for the driving arm in the initial position of the tool and at the other end thereof a bevel for engaging the free end of the projecting member.

6. A tool as claimed in claim 1 wherein one stripping jaw is rigidly connected to the pulling means.

7. A tool as claimed in claim 1 in which the elongated main body comprises the first clamping jaw rigidly associated with a handle portion.

8. A tool as claimed in claim 1 further provided with means for cutting a cable.

9. A tool as claimed in claim 8 wherein said cutting means comprise opposing engageable means mounted on said pulling means and on said main body, one or both of said opposing engageable means being provided with a cutting blade.

10. A tool as claimed in claim 9 wherein the cable cutting means are disposed in an opening in the elongated main body.

11. A tool as claimed in claim 9 wherein the cable cutting means are disposed in a recess in an edge of the elongated main body.

12. A tool as claimed in claim 11 further provided with a guard member at the rearward edge of the said recess.

13. A tool as claimed in claim 9 with a removable cove protecting the cutting means.

14. A tool as claimed in claim 10 in which opening in the elongated main body is associated with a channel extending to the edge of said elongated main body.

15. A tool as claimed in claim 1 further provided with means on the clamping jaws for retaining the cutting jaws in a substantially constant position during longitudinal movement of the cutting jaws.

16. A tool as claimed in claim 15, wherein the retaining means comprise an adjustable, pivotally disposed bridge on at least one of the clamping jaws and an adjusting means acting against an inclined surface on one side of the bridge.

17. A tool as claimed in claim 1 in which biasing means are provided for biasing the whole tool to an initial position ready to receive a cable.

18. A tool as claimed in claim 17 wherein the biasing means comprise a spring means engaging the stripping jaws for biasing said stripping jaws away from each other.

19. A tool as claimed in claim 1 which the pulling means comprises a longitudinally disposed member which is at least partially of non-circular cross-section and which is guided in an opening having a cross section corresponding to the portion of the pulling member located in the said opening.

20. A tool as claimed in claim 1 in which the main body comprises a hollow double-walled body at least partially housing the pulling means, the stripping jaws, and the means for operating the stripping and clamping jaws.

* * * * *